May 18, 1943. J. E. DRENNAN 2,319,447
TIRE MOLD
Filed Nov. 12, 1940

INVENTOR.
J. E. Drennan
BY Carlos G. Stratton
ATTORNEY.

Patented May 18, 1943

2,319,447

UNITED STATES PATENT OFFICE 2,319,447

TIRE MOLD

Jimmy E. Drennan, Lynwood, Calif.

Application November 12, 1940, Serial No. 365,323

5 Claims. (Cl. 18—18)

My invention relates to a tire mold. The principal object of the invention is to provide a tire mold for vulcanizing new side walls to tires, especially white or colored side walls.

Another object of the invention is to provide such a tire mold that will not vulcanize the shoulders or tread of the tire that is having a new side wall vulcanized thereto.

Still another object of the invention is to provide such a tire mold that will fit different sizes of tires.

Further objects of the invention are to provide such a tire mold that is positive in operation, convenient in use, economical of manufacture, relatively simple, and generally superior and serviceable.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Figure 1:
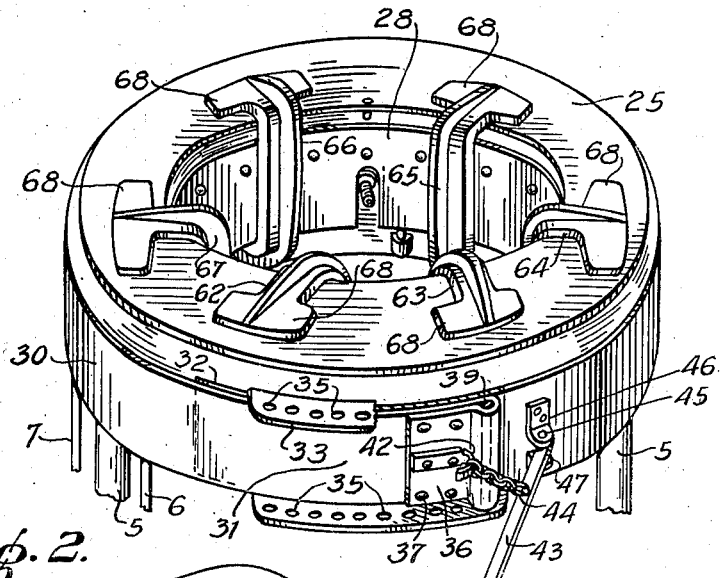
Fig. 1 is a perspective view of an embodiment of my invention, with part of the supporting structure broken away.
Figure 2:
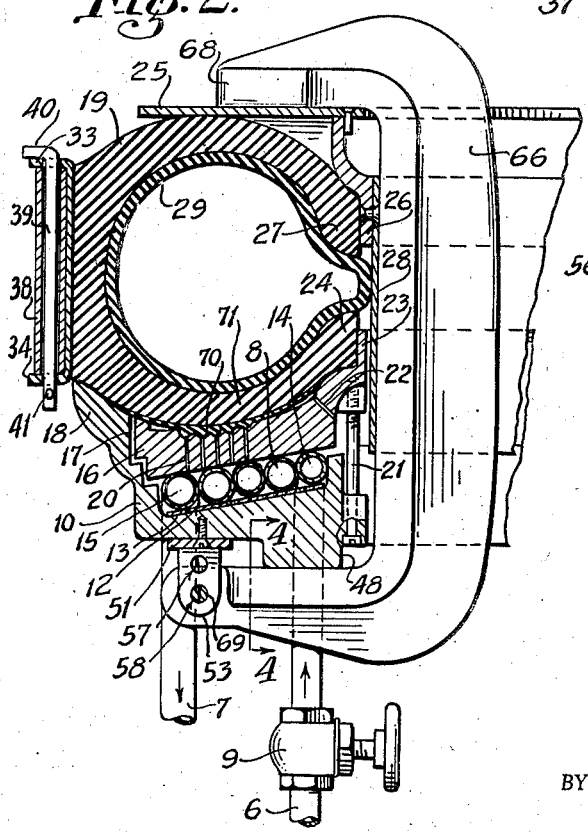
Fig. 2 is an enlarged cross sectional view of said embodiment containing a tire that is having a new side wall vulcanized thereto.
Figure 3:
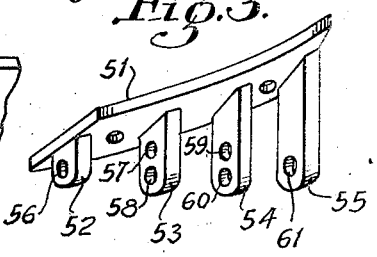
Fig. 3 is a perspective view of one of a series of pivot plates mounted on the body of the mold.
Figure 4:
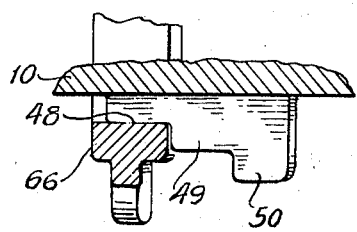
Fig. 4 is a broken elevation, partly in section, illustrating abutments utilized in different adjustments of the mold.

Referring more in detail to the drawing, the reference numerals 5 indicate standards or legs upon which the mold is supported. Steam pipes 6 and 7 lead to and from a coil 8, for supplying steam heat to the mold. A valve 9 controls the flow of steam to the coil.

The base member 10 of the mold is supported upon the legs 5. The base member 10 has an inclined inner face 12 supporting insulation 13 thereon. The coil 8 rests upon the inclined insulation 13. The highest turn 14 of the coil is the inlet end, connected with the conduit 6, while the lowest turn 15 of the coil is directly connected with the outlet conduit 7. The turns of the coil between the upper turn 14 and lowermost turn 15 gradually increase in diameter, to permit gradual expansion of the steam.

A vulcanizing plate 16 rests upon the coil 8, and is spaced from the base member 10 by means of an air space 17, in order that the heat from the coil 8 may not be transmitted through the plate 16 to the upper portion 18 of the base member, whereby not to heat the shoulder of the tire 19. The plate 16 has vents 20 extending substantially vertically therethrough from the coil 8 to the tire 19.

Bolts 21 connect the vulcanizing plate 16 with the base 10, to hold the plate 16 in contact with the upper surface of the coil 8 and out of contact with the base 10. A vent 22 is angularly arranged through the plate 16 near its inner circumference. The vents prevent air pockets from forming on the inner face of the plate 16. The plate 16 also has an upwardly extending flange 23 for engaging a bead 24 of the tire 19.

A top plate 25 of the mold has depending therefrom a flange 26 that engages the other bead 27 of the tire 19. A downwardly extending rim 28 is fastened to the flange 26 and extends downwardly beyond the flange 23. An air bag 29 engages the rim 28 between the beads 24, 27, and between the flanges 23, 26.

A band 30 has overlapping ends 31 and 32, to compensate for tires of different circumferences. The end 32 has opposed flanges 33 and 34 that have alined apertures 35. The end 31 is bent back upon itself, as shown at 36, and fastened by rivets 37, or other suitable fastening means. Said bending back of the end 31 forms a loop 38 which extends from one flange 33 to the other flange 34. A pin 39, having an upper bent end 40, is dropped down through the nearest aperture 35 in the upper flange 33, through the loop 38, and down through the lower flange 34. A key 41 fastens the pin 39 in said position.

A hook 42 is mounted on the fold 36 and connected to a lever 43 by means of a chain 44. The lever 43 is pivoted on a fulcrum 45 mounted on brackets 46 and 47 on end 32.

The base member 10 has a series of abutments 48, 49 and 50 integral therewith on the under side. Bolted on the under side of the base 10 is a series of six circularly alined, curved plates 51. Depending downwardly from the plates 51 are lugs 52, 53, 54 and 55, of successively longer lengths. Bearing openings 56 and 57 on the lugs 52 and 53 are alined with each other, while bearing openings 58 and 59 on the lugs 53 and 54 are alined with each other. Bearing openings 60 and 61 on the lugs 54 and 55 are also alined with each other.

A series of C-clamps 62 to 67 extend through and around the rim 28 on the inner circumference of the tire 19. The C-clamps have broadened upper ends 68 bearing upon the plate 25. The lower ends of the C-clamps are pivoted to the lugs on the plate 51 by means of pivot pins 69.

In the operation of my device, a tire 19, containing an air bag 29, is placed in the mold. The tire casing 71, having a new side wall member 70 applied to the side thereof, is placed in the mold with the side wall member 70 against the vulcanizing plate 16. The new side wall 70 is white and/or contains desired configuration, or is of any other desired color. The band 30 is then placed around the tire upon the tread thereof. By means of the lever 43 and chain 44, the band is tightened upon the tread of the tire. When the band is so tightened, the pin 39 is dropped through alined openings 35 and through the loop 38, to fasten the band in place.

The C-clamps are then pivotally connected with the desired lugs on the plate 51, by means of the pivot pins 69. When larger tires are placed in the mold, the C-clamps are connected with the shorter lugs, in order to raise the upper ends 68 of the C-clamps whereby to make room for the larger tire. When a smaller tire is placed in the mold, the lower ends of the C-clamps are connected with the longer lugs on the plate 51, in order to lower the upper ends 68 of the C-clamps. The C-clamps are connected with the intermediate size lugs when an in-between size tire is placed in the mold.

When the C-clamps are pivoted in place, they are swung through the opening within the rim 28 until they abut the shortest abutments 48. These provide stops for the C-clamps, in order to determine the positions of the clamps. When the clamps are pivoted on the longer lugs on the plates 51, the clamps engage the longest abutments 50, and when the clamps are pivoted on the intermediate lugs, the clamps engage the intermediate abutments 49.

After the tire is so placed in the mold, after the top plate 25 and depending rim 28 are placed in position, and the C-clamps swung to their positions shown in the drawing, air pressure is introduced into the bag 29 and the steam valve 9 admits steam pressure, which vulcanizes the new side wall 70 in place upon the tire. The valve 9 is closed when the mold is not in use.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. In a tire mold, a mold plate arranged to vulcanize a side wall of the tire, means arranged to engage the opposite side wall of the tire, a C-clamp pivoted to said mold plate and arranged to be swung to and from a position clamping together the mold plate and the first named means, means forming an adjustable pivotal connection between the mold plate and clamp, an abutment adjacent the pivot having stepped portions complementing the pivotal adjustment of the clamp and arranged to limit swinging movement of the clamp when the latter has reached its clamping position, and means aranged to heat the mold plate.

2. In a tire mold, a mold plate arranged to vulcanize a side wall of a tire, means arranged to engage the opposite side wall of the tire, a C-clamp pivoted to the mold plate and arranged to be swung to and from a position clamping together the mold plate and the first named means, the mold plate having a series of bearings different distances from the side wall of the tire, a pivot pin dimensioned to fit in any of said bearings and pivotally connecting the clamp on the mold plate, a series of abutments arranged different distances from the side wall of the tire to limit swinging movements of the clamp, the abutments being arranged to limit swinging movements of the clamp in its several pivoted positions, and means arranged to heat the mold plate.

3. In a tire mold, a vulcanizing plate arranged to vulcanize a side wall of a tire, a mold plate supporting said vulcanizing plate and having a portion arranged to contact the shoulder on the same side of the tire, means connecting the plates and bodily spacing the same from each other for heat insulation, a heating coil arranged between the plates to heat the vulcanizing plate and insulated from the mold plate, means arranged to engage the opposite side wall of the tire, and means clamping the plates and said means in position.

4. In a tire mold, a vulcanizing plate disposed to engage and vulcanize an inclined side wall of a tire, a coil contacting said plate and arranged at an incline to heat the plate, the inlet end of the coil being higher than the outlet end thereof, a mold plate supporting said coil and having a portion thereof arranged to contact the shoulder on the same side of the tire as that engaged by the first-mentioned plate, means connecting and spacing the plates for insulating them from each other, means arranged to engage the opposite side wall of the tire, and means clamping the plates and said means in position.

5. In a tire side wall vulcanizing mold, the combination with a mold plate and means in connection therewith for clamping a tire, said mold plate having a transversely inclined flange around its outer perimeter to engage the outer portion of the side wall of a clamped tire, a heating coil supported on said plate radially inwardly of its flange, a vulcanizing plate resting on said coil and spaced thereby from the coil supporting surface of the mold plate, and connecting bolts connecting said plates at spaced points around their inner perimeters and serving to maintain the vulcanizing plate in definitely spaced relation to the mold plate flange.

JIMMY E. DRENNAN.